United States Patent
Hidaka

(10) Patent No.: US 9,226,331 B2
(45) Date of Patent: *Dec. 29, 2015

(54) RADIO TERMINAL AND RADIO COMMUNICATION METHOD

(71) Applicant: KYOCERA CORPORATION, Kyoto (JP)

(72) Inventor: Hiroyuki Hidaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,498

(22) Filed: Dec. 22, 2014

(65) Prior Publication Data

US 2015/0111572 A1 Apr. 23, 2015

Related U.S. Application Data

(63) Continuation of application No. 12/672,888, filed as application No. PCT/JP2008/064348 on Aug. 8, 2008.

(30) Foreign Application Priority Data

Aug. 10, 2007 (JP) ................. 2007-209098

(51) Int. Cl.
| | | |
|---|---|---|
| *H04W 76/02* | (2009.01) | |
| *H04W 48/16* | (2009.01) | |
| *H04W 40/24* | (2009.01) | |
| *H04W 84/18* | (2009.01) | |

(52) U.S. Cl.
CPC ............ *H04W 76/023* (2013.01); *H04W 40/24* (2013.01); *H04W 48/16* (2013.01); *H04W 84/18* (2013.01)

(58) Field of Classification Search
CPC ..... H04W 4/005; H04W 4/006; H04W 36/12; H04W 40/02; H04W 40/10; H04W 40/12; H04W 40/24; H04W 40/246; H04W 40/248; H04W 72/0406; H04W 84/12; H04W 84/18; H04W 84/20; H04W 84/22; H04L 45/02; H04L 45/028; H04L 45/122; H04L 45/126; H04L 45/20
USPC ......... 455/9–11.1, 15–16, 41.2, 115.1–115.4, 455/132–135, 418–420, 424–425, 455/432.1–432.3, 435.1–445; 370/254, 370/331, 351, 338
See application file for complete search history.

(56) References Cited

U.S. PATENT DOCUMENTS

| | | | |
|---|---|---|---|
| 8,649,732 B2 * | 2/2014 | Hidaka .................. | 455/11.1 |
| 2003/0124979 A1 * | 7/2003 | Tanada ................. | H04W 84/20 455/41.1 |
| 2004/0043782 A1 * | 3/2004 | Gupta ................... | 455/517 |
| 2005/0037789 A1 * | 2/2005 | Rhee ................... | H04W 40/246 455/507 |
| 2007/0189252 A1 | 8/2007 | Kawakami | |

* cited by examiner

*Primary Examiner* — Michael Mapa
(74) *Attorney, Agent, or Firm* — Duane Morris LLP

(57) ABSTRACT

A radio terminal according to a present invention comprising a communication judgment unit (131) configured to judge whether or not the direct communication with the radio base station is possible to continue; a message processor (132) configured to transmit an inquiry message inquiring whether or not a direct communication with the radio base station is possible, to a lower-level radio terminal in the tree structure network, when the continuation judgment unit judges that the direct communication with the radio base station is not possible to continue; and a master manager configured to register the lower-level radio terminal as an upper-level radio terminal in the tree structure network, upon receipt of a response message indicating that a direct communication with the radio base station is possible, from the lower-level radio terminal.

3 Claims, 7 Drawing Sheets

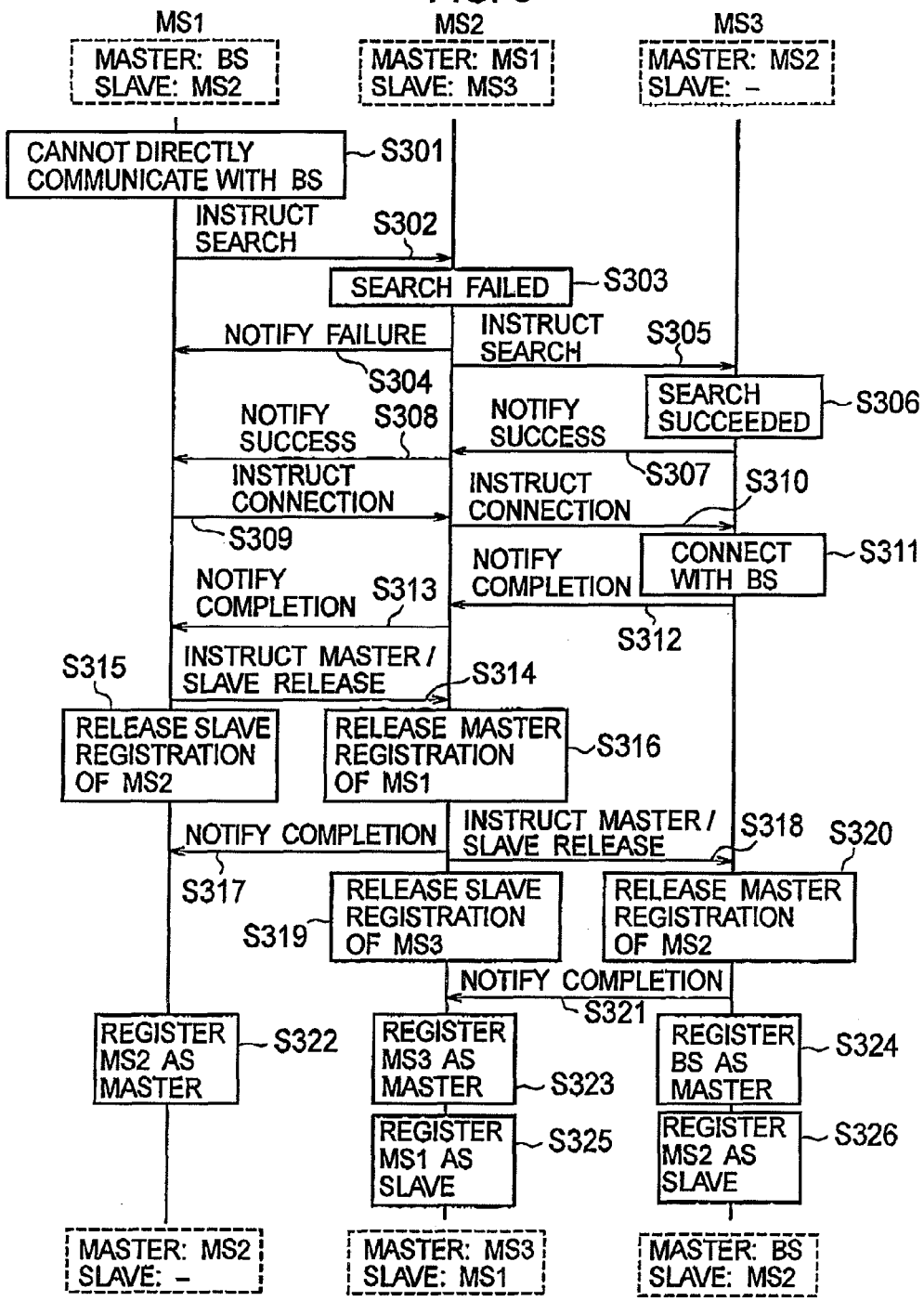

RADIO TERMINAL AND RADIO COMMUNICATION METHOD

CROSS-REFERENCE TO RELATED APPLICATIONS

The present application is a continuation of U.S. application Ser. No. 12/672,888, filed on Feb. 9, 2010, which is a U.S. National Phase Application of International Application No. PCT/JP2008/064348, filed on Aug. 8, 2008, which claims priority to Japanese Patent Application No. 2007-209098, filed on Aug. 10, 2007, the disclosures of each of these applications are incorporated herein by reference.

TECHNICAL FIELD

The present invention relates to: a radio terminal forming a tree structure network in which a radio terminal directly communicating with a radio base station is set to be a root radio terminal; and a radio communication method used by the radio terminal.

BACKGROUND ART

An ad hoc network has conventionally been known, which is a radio network autonomously configured by multiple radio terminals each having a relay function. Meanwhile, a technique by which a radio terminal forming an ad hoc network communicates with a radio base station has been proposed (see Patent Document 1, for example). Specifically, the radio terminal communicates with the radio base station via a different radio terminal.

To be more specific, a tree structure network is formed of multiple radio terminals, and has a radio terminal directly communicating with a radio base station, as a root. A lower-level radio terminal is configured to communicate with the radio base station via an upper-level radio terminal, and hence the lower-level radio terminal can communicate with the radio base station even when being outside a radio wave reachable range of the radio base station. Patent Document 1: Japanese Patent Application Publication No. 2003-124876 (pp. 6 to 7, FIG. 7).

DISCLOSURE OF THE INVENTION

In the above-described tree structure network, the root radio terminal is not always capable of continuing the direct communication with the radio base station. For example, the technique has a problem that, when the root radio terminal moves outside the radio wave reachable range of the radio base station, the radio terminal and the radio base station cannot continue the direct communication.

In addition, the technique has a problem that, when the root radio terminal cannot continue a direct communication, the lower-level radio terminal communicating with the radio base station via the root radio terminal and being outside the radio wave reachable range cannot communicate with the radio base station.

The present invention has been made in view of the above-described problems, and is aimed to provide a radio terminal and a radio communication method used by the radio terminal. The radio terminal enables a radio terminal forming a tree structure network, to communicate with a radio base station when a root radio terminal of the tree structure network cannot continue a direct communication with the radio base station, the root radio terminal being a radio terminal directly communicating with the radio base station.

In order to solve the aforementioned problem, the present invention includes the following characteristics. To begin with, a first characteristic of the present invention is summarized as a radio terminal (radio terminal MS) forming a tree structure network (ad hoc network AH) in which a radio terminal directly communicating with a radio base station (radio base station BS) is set to be a root, the radio terminal comprising: a direct communication unit (base station communication unit 110) configured to perform a direct communication with the radio base station; a continuation judgment unit (communication judgment unit 131) configured to judge whether or not the direct communication with the radio base station is possible to continue; an inquiry message transmitter (message processor 132) configured to transmit an inquiry message (search instruction) inquiring whether or not a direct communication with the radio base station is possible, to a lower-level radio terminal (slave) in the tree structure network, when the continuation judgment unit judges that the direct communication with the radio base station is not possible to continue; and an upper-level terminal register (master management unit 133) configured to register the lower-level radio terminal as an upper-level radio terminal (master) in the tree structure network, upon receipt of a response message indicating that a direct communication with the radio base station is possible, from the lower-level radio terminal.

According to this aspect, when judging that the direct communication between the root radio terminal and the radio base station is not possible to continue, the radio terminal transmits a message for inquiring whether or not a direct communication with the radio base station is possible, to the lower-level radio terminal. When receiving a response message indicating that a direct communication with the radio base station is possible, from the lower-level radio terminal, the radio terminal registers the lower-level radio terminal as an upper-level radio terminal of the tree structure network.

In other words, when a direct communication between the upper-level radio terminal and the radio base station is not possible while a direct communication between the lower-level radio terminal and the radio base station is possible, the radio terminals forming the tree structure network can continue communicating with the radio base station, by reversing the relationship between the upper-level radio terminal and the lower-level radio terminal.

A second characteristic of the present invention is summarized as the radio communication terminal according to the first characteristic, further comprising: an instruction message transmitter (message processor 132) configured to transmit an instruction message (connection instruction) instructing the lower-level radio terminal to start a direct communication with the radio base station, upon receipt of the response message indicating that a direct communication with the radio base station is possible, from the lower-level radio terminal.

A third characteristic of the present invention is summarized as the radio communication terminal according to the first characteristic, further comprising: an indirect communication unit (ad hoc communication unit 120) configured to communicate with the radio base station via the upper-level radio terminal registered by the upper-level terminal register.

A fourth characteristic of the present invention is summarized as the radio communication terminal according to the first characteristic, wherein the direct communication unit stops receiving a radio signal transmitted by the radio base station, when the lower-level radio terminal is registered as the upper-level radio terminal (master) in the tree structure network by the upper-level terminal register.

A fifth characteristic of the present invention is summarized as the radio communication terminal according to any one of the first to fourth characteristics, further comprising: a reception quality measurement unit (communication judgment unit 131) configured to measure a reception quality, which is a quality of a radio signal received from the radio base station; and a threshold comparison unit (communication judgment unit 131) configured to compare the reception quality measured by the reception quality measurement unit, with a threshold, wherein the continuation judgment unit judges that the direct communication with the radio base station is not possible to continue, when the reception quality is below the threshold.

A sixth characteristic of the present invention is summarized as the radio communication terminal according to any one of the first to fourth characteristics, further comprising: a remaining battery charge amount detector (communication judgment unit 131) configured to detect a remaining battery (battery 150) charge amount; and a threshold comparison unit (communication judgment unit 131) configured to compare the remaining battery charge amount detected by the remaining battery charge amount detector, with a threshold, wherein the continuation judgment unit judges that the direct communication with the radio base station is not possible to continue, when the remaining battery charge amount is below the threshold.

A seventh characteristic of the present invention is summarized as the radio communication terminal according to any one of the first to fourth characteristics, further comprising: a call restriction detector (communication judgment unit 131) configured to detect a call restriction restricting the direct communication with the radio base station, wherein the continuation judgment unit judges that the direct communication with the radio base station is not possible to continue, when the call restriction is detected by the call restriction detector.

An eighth characteristic of the present invention is summarized as a radio terminal (radio terminal MS) forming a tree structure network (ad hoc network AH) in which a radio terminal directly communicating with a radio base station (radio base station BS) is set to be a root, the radio terminal comprising: an inquiry message receiver (message processor 132) configured to receive an inquiry message inquiring whether or not a direct communication with the radio base station is possible, from an upper-level radio terminal (master) in the tree structure network; a communication judgment unit (communication judgment unit 131) configured to judge whether or not a direct communication with the radio base station is possible, when the inquiry message receiver receives the inquiry message; a direct communication unit (base station communication unit 110) configured to perform a direct communication with the radio base station, when the communication judgment unit judges that a direct communication with the radio base station is possible; and a lower-level terminal register (slave management unit 135) configured to register the upper-level radio terminal as a lower-level radio terminal (slave) in the tree structure network.

According to this aspect, when receiving a message for inquiring whether or not a direct communication with the radio base station is possible, from the upper-level radio terminal, the radio terminal judges whether or not a direct communication with the radio base station is possible. When judging that the direct communication is possible, the radio terminal performs a direct communication with the radio base station. Moreover, the radio terminal registers the upper-level radio terminal as the lower-level radio terminal.

In other words, when a direct communication between the upper-level radio terminal and the radio base station is not possible while a direct communication between the lower-level radio terminal and the radio base station is possible, the radio terminals forming the tree structure network can continue communicating with the radio base station, by reversing the relationship between the upper-level radio terminal and the lower-level radio terminal.

A ninth characteristic of the present invention is summarized as the radio communication terminal according to the eighth characteristic, further comprising: a communication relay unit (communication relay unit 137) configured to relay a communication between the radio base station and the lower-level radio terminal registered by the lower-level terminal register.

A tenth characteristic of the present invention is summarized as the radio communication terminal according to the eighth characteristic, further comprising: a response message transmitter (message processor 132) configured to transmit a response message (search result) indicating that a direct communication with the radio base station is possible, to the upper-level radio terminal, when the communication judgment unit judges that a direct communication with the radio base station is possible; and an instruction message receiver (message processor 132) configured to receive an instruction message (connection instruction) instructing the radio terminal to start a direct communication with the radio base station, from the upper-level radio terminal, wherein the direct communication unit performs a direct communication with the radio base station when the communication judgment unit judges that a direct communication with the radio base station is possible and the instruction message receiver receives the instruction message.

An eleventh characteristic of the present invention is summarized as the radio communication terminal according to the eighth characteristic, further comprising: an inquiry message transmitter (message processor 132) configured to transmit the inquiry message to a lower-level radio terminal (slave) in the tree structure network when the communication judgment unit judges that a direct communication with the radio base station is not possible.

A twelfth characteristic of the present invention is summarized as a radio communication method used by a radio terminal forming a tree structure network in which a radio terminal directly communicating with a radio base station is set to be a root, the radio communication method comprising the steps of: performing a direct communication with the radio base station; judging whether or not a direct communication with the radio base station is possible to continue; transmitting an inquiry message inquiring whether or not a direct communication with the radio base station is possible, to a lower-level radio terminal in the tree structure network, when it is judged in the judging step that the direct communication with the radio base station is not possible to continue; and registering the lower-level radio terminal as an upper-level radio terminal in the tree structure network, upon receipt of a response message indicating that a direct communication with the radio base station is possible, from the lower-level radio terminal.

A thirteenth characteristic of the present invention is summarized as a radio communication method used by a radio terminal forming a tree structure network in which a radio terminal directly communicating with a radio base station is set to be a root, the radio communication method comprising the steps of: receiving an inquiry message inquiring whether or not a direct communication with the radio base station is possible, from an upper-level radio terminal in the tree structure network; judging whether or not a direct communication with the radio base station is possible, when the inquiry message is received in the receiving step; performing a direct communication with the radio base station when it is judged in the judging step that a direct communication with the radio base station is possible; and registering the upper-level radio terminal as a lower-level radio terminal in the tree structure network, when it is judged in the judging step that a direct communication with the radio base station is possible.

The present invention can provide: a radio terminal which enables radio terminals forming a tree structure network, to communicate with a radio base station even when a root radio terminal of the tree structure network cannot continue a direct communication with the radio base station, the root radio terminal being a radio terminal directly communicating with the radio base station; and a radio communication method used by the radio terminal.

BRIEF DESCRIPTION OF THE DRAWINGS

FIG. 8 is a sequence diagram showing Operation Example 2 of the master/slave reversing operation according to the embodiment of the present invention.

BEST MODES FOR CARRYING OUT THE INVENTION

Figure 1:
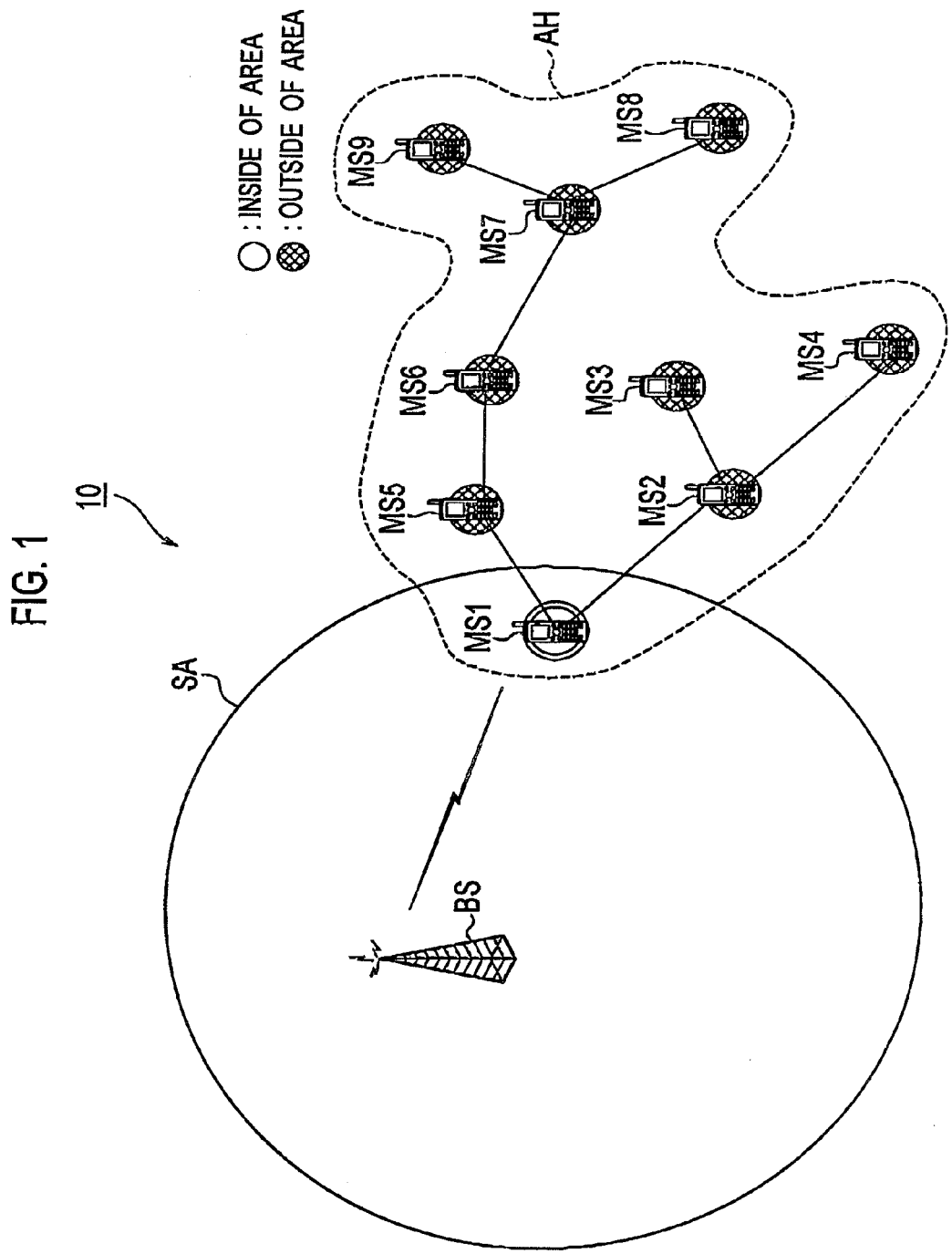
FIG. 1 is a schematic configuration view of an entire radio communication system according to an embodiment of the present invention.

Next, an embodiment of the present invention is described with reference to the drawings. Specifically, description is given of (1) a schematic configuration of an entire radio communication system, (2) a configuration of a radio terminal, (3) operation of the radio terminal, (4) operations and effects, and (5) other embodiments.

It is to be noted that the same or similar reference numerals are attached to the same or similar elements in the following description of the embodiment.

(1) Schematic Configuration of Entire Radio Communication System

FIG. 1 is a schematic configuration view of an entire radio communication system 10 according to this embodiment. As shown in FIG. 1, the radio communication system 10 includes a radio base station BS and radio terminals MS1 to MS9.

The radio base station BS has a service area (radio wave reachable area) SA in which the radio base station BS can directly communicate with a radio terminal. In the example in FIG. 1, the radio base station BS directly communicates with the radio terminal MS1 in the service area SA.

The radio terminals MS1 to MS9 each has: a function of performing a direct communication (single-hop communication) with the radio base station BS; and a function of performing a communication (multi-hop communication) with the radio base station BS via at least one of the other radio terminals.

In this embodiment, the radio terminals MS1 to MS9 form an ad hoc network AH, which is an autonomous radio network. The ad hoc network AH has a tree structure in which the radio terminal MS1 directly communicating with the radio base station BS is in the highest hierarchical level (the root node).

In the example in FIG. 1, in the ad hoc network AH having the tree structure, the radio terminal MS2 and the radio terminal MS5, connecting to the radio terminal MS1, are in the same hierarchical level. The radio terminal MS3 and the radio terminal MS4, connecting to the radio terminal MS2, and the radio terminal MS6, connecting to the radio terminal MS5, are in the same hierarchical level. The radio terminal MS8 and the radio terminal MS9 are in the lowest hierarchical level (leaf nodes).

The radio terminals MS1 to MS9 each store a radio terminal belonging to the level immediately above that of itself, as a master, while storing a radio terminal belonging to the level immediately below that of itself, as a slave. For example, the radio terminal MS2 stores the radio terminal MS1 as a master while storing the radio terminal MS3 and the radio terminal MS4 as slaves.

Since having the same configuration, the radio terminals MS1 to MS9 are collectively called a radio terminal MS in the following description as appropriate.

(2) Configuration of Radio Terminal

Next, a configuration of the radio terminal MS is described with reference to FIG. 2 and FIG. 3. Specifically, description is given of (2.1) a hardware configuration of the radio terminal and (2.2) a functional block configuration of the radio terminal.

(2.1) Hardware Configuration of Radio Terminal

Figure 2:
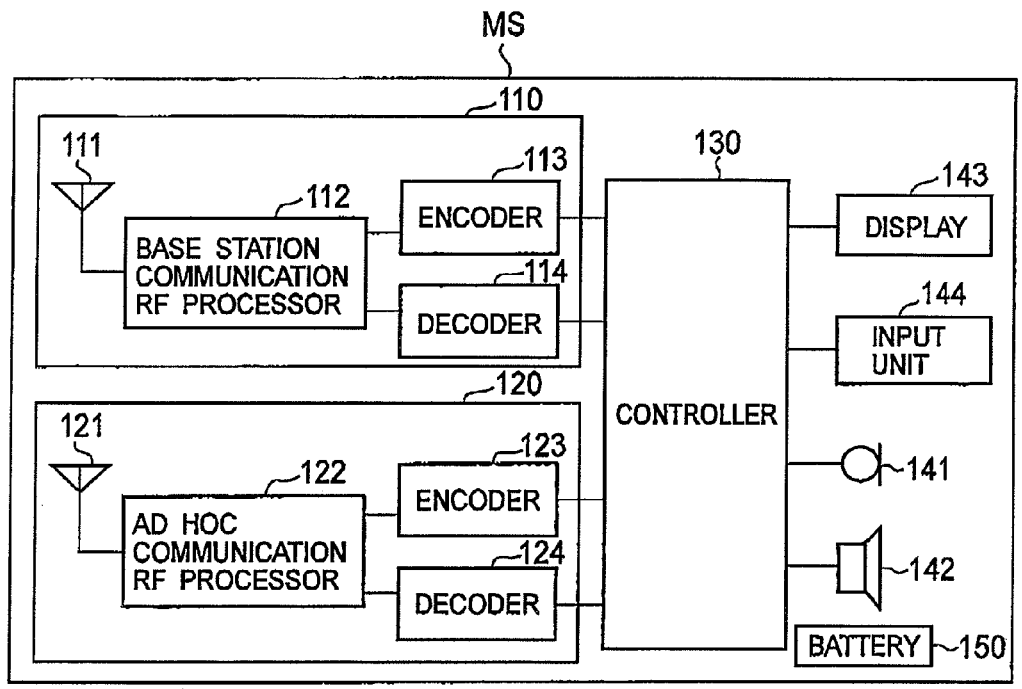
FIG. 2 is a hardware configuration diagram of a radio terminal according to the embodiment of the present invention.

FIG. 2 is a hardware configuration diagram of the radio terminal MS. As shown in FIG. 2, the radio terminal MS includes a base station communication unit 110, an ad hoc communication unit 120, a controller 130, a display 143, an input unit 144, a microphone 141, a speaker 142 and a battery 150.

The base station communication unit 110 is connected to the radio base station BS, and performs a direct communication with the radio base station BS. The base station communication unit 110 transmits and receives, for example, a CDMA radio signal (RF signal) to and from the radio base station BS. Moreover, the radio base communication unit 110 performs conversion between a radio signal and a baseband signal, and transmits and receives a baseband signal to and from the controller 130.

The ad hoc communication unit 120 is connected to one of the radio terminals forming the ad hoc network AH, and communicates with the radio base station BS via the radio terminal. The ad hoc communication unit 120 has a configuration in conformity with a wireless LAN standard (IEEE 802.11 or the like) or a Bluetooth (registered trademark) standard. The ad hoc communication unit 120 performs conversion between a radio signal and a baseband signal, and transmits and receives a baseband signal to and from the controller 130.

The display 143 displays an image received via the controller 130 and operation contents (inputted telephone number, address and the like). The input unit 144 is formed of numeric keys, function keys and the like, and is used by a user to input operation contents.

The microphone 141 converts sound to an electric signal, and then inputs the electric signal into the controller 130. The speaker 142 converts an electric signal from the controller 130, to sound, and then outputs the sound.

The controller 130 is formed of a CPU and a memory, and controls various functions included in the radio terminal MS. The memory stores various kinds of information used for control and the like in the radio terminal MS. The battery 150 stores power for operating the radio terminal MS, and supplies stored power to each block.

The base station communication unit 110 includes an antenna 111, a base station communication RF processor 112, an encoder 113 and a decoder 114.

The encoder 113 encodes a baseband signal from the controller 130. The base station communication RF processor 112 up-converts and amplifies the encoded baseband signal, to generate a radio signal. The generated radio signal is transmitted outside via the antenna 111.

The base station communication RF processor 112 amplifies and down-converts a radio signal inputted via the antenna 111, to generate a baseband signal. The decoder 114 decodes the generated baseband signal and then inputs the decoded baseband signal to the controller 130.

The ad hoc communication 120 includes an antenna 121, an ad hoc communication RF processor 122, an encoder 123 and a decoder 124. The antenna 121, the ad hoc communication RF processor 122, the encoder 123 and the decoder 124 are configured the same as the antenna 111, the base station communication RF processor 112, the encoder 113 and the decoder 114, and thus the same description is omitted here.

(2.2) Functional Block Configuration of Radio Terminal

Figure 3:
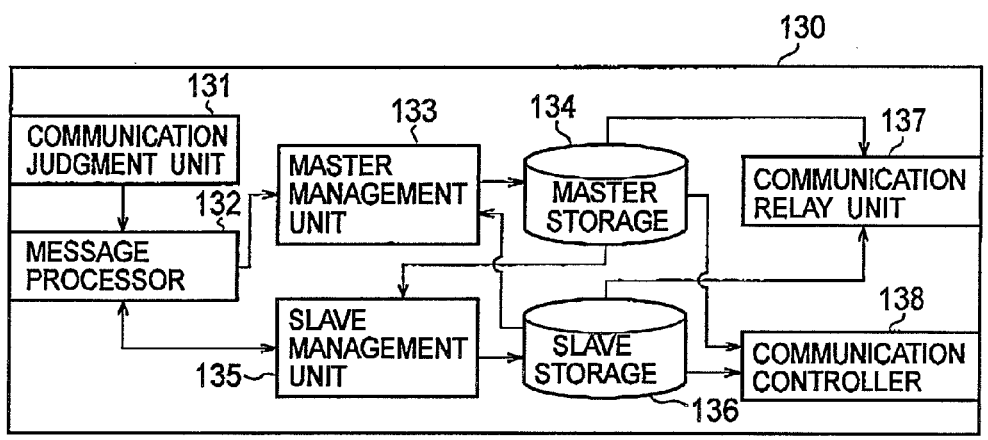
FIG. 3 is a functional block configuration diagram of the radio terminal according to the embodiment of the present invention.

FIG. 3 is a functional block configuration diagram of the radio terminal MS, specifically, a block diagram showing functions implemented by the controller 130. It is to be noted that description is given below of features related to the present invention.

As shown in FIG. 3, the controller 130 includes a communication judgment unit 131, a message processor 132, a master management unit 133, a master storage 134, a slave management unit 135, a slave storage 136, a communication relay unit 137 and a communication controller 138.

During a direct communication with the radio base station BS, the communication judgment unit 131 judges whether or not the direct communication can be continued, on the basis of at least one of the following judgments (a) to (c).

(a) The communication judgment unit 131 measures reception quality which is quality of a radio signal (e.g., a notification signal such as a pilot signal) received from the radio base station BS, and compares the measured reception quality with a threshold.

As the reception quality, a RSSI (Received Signal Strength Indicator), a SNR (Signal to Nose Ratio), a CNR (Carrier to Noise Ratio) or an error rate can be used, for example. When the reception quality is below the threshold, the communication judgment unit 131 judges that the direct communication with the radio base station BS cannot be continued.

(b) The communication judgment unit 131 detects a remaining battery charge amount of the battery 150, and compares the detected remaining battery charge amount with a threshold. When the remaining battery charge amount of the battery 150 is below the threshold, the communication judgment unit 131 judges that the direct communication with the radio base station BS cannot be continued.

(c) The communication judging unit 131 detects a call restriction which restricts the direct communication with the radio base station BS. When the radio terminal MS fails to establish a connection with the radio base station BS after a call restriction is detected by a call restriction detector, the communication judgment unit 131 judges that the direct communication with the radio base station BS cannot be continued.

When the ad hoc communication unit 120 and the message processor 132 receive a search instruction to search for a radio base station BS, from the master, the communication judgment unit 131 performs a base station search. The communication judgment unit 131 may perform any of the above-described judgments (a) to (c), in addition to the base station search.

The message processor 132 transmits and receives mainly the following messages to and from the master and slaves: a search instruction to instruct a base station search (inquiry message); a search result which is a result of a base station search (response message); and a connection instruction to perform a direct communication with the radio base station BS (instruction message).

The master management unit 133 stores identification information for identifying the master, in the master storage 134. The slave management unit 135 stores identification information for identifying each slave, in the slave storage 136. As the identification information, a terminal ID or an address (IP address or MAC address) can be used.

In the event of master/slave reversing, the master management unit 133 reads corresponding identification information stored in the slave storage 136, and stores the read identification information in the master storage 134.

Similarly, in the event of master/slave reversing, the slave management unit 135 reads the identification information stored in the master storage 134, and stores the read identification information in the slave storage 136.

The communication relay unit 137 relays a communication between each slave and the master. Specifically, the communication relay unit 137 relays data (packets) transmitted and received between the slave and master, on the basis of the identification information stored in the master storage 134 and the corresponding identification information stored in the slave storage 136.

The communication controller 138 controls the base station communication unit 110 and the ad hoc communication unit 120. When a master is registered by the master management unit 133, the communication controller 138 stops the base station communication unit 110 from receiving a radio signal (e.g., a notification signal such as a pilot signal) transmitted by the radio base station BS.

(3) Operation of Radio Terminal

Next, description is given of operation of the radio terminal MS by using FIG. 4 to FIG. 8, specifically, (3.1) ad hoc network building operation and (3.2) master/slave reversing operation.

(3.1) Ad Hoc Network Building Operation

Figure 4:
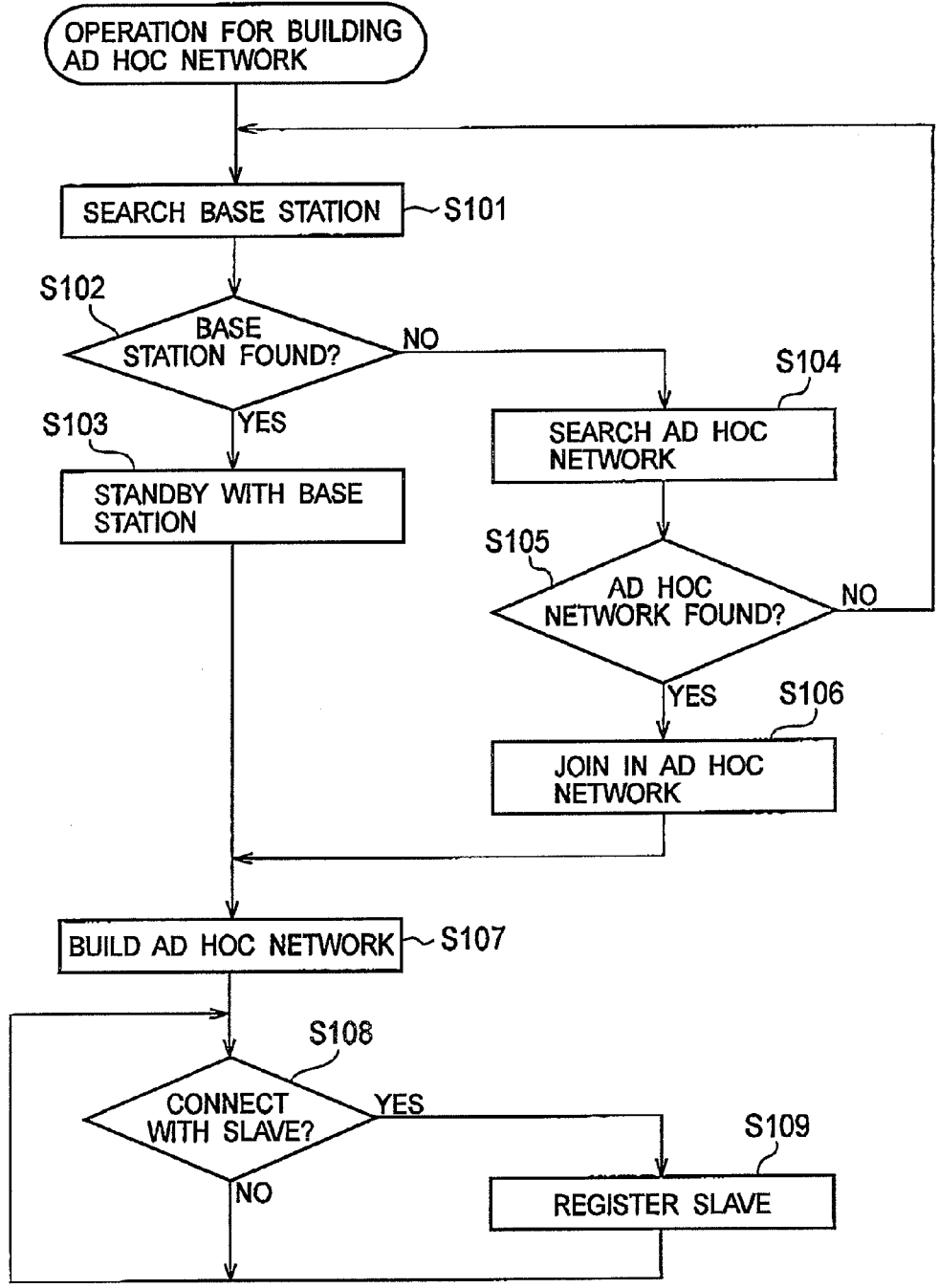
FIG. 4 is a flowchart showing ad hoc network building operation performed by the radio terminal according to the embodiment of the present invention.

FIG. 4 is a flowchart showing operation for building the ad hoc network AH performed by the radio terminal MS.

In Step S101, the radio terminal MS performs a base station search to find a radio base station BS with which a direct communication is possible. For example, when the reception level of a radio signal received from a radio base station BS is stable and the reception level is not lower than a certain level, the radio terminal MS judges that a direct communication with the radio base station BS is possible.

In Step S102, the radio terminal MS judges whether or not a radio base station BS with which a direct communication is possible is found. When finding a radio base station BS with which a direct communication is possible, the radio terminal MS enters a standby state in Step S103.

When not finding a radio base station BS with which a direct communication is possible, on the other hand, the radio terminal MS searches for an ad hoc network AH in Step S104. For example, the radio terminal MS transmits a connection request signal to a certain area, and judges whether or not a different radio terminal MS within the ad hoc network AH returns a response.

In Step S105, the radio terminal MS judges whether or not an ad hoc network AH is found.

When finding an ad hoc network AH, the radio terminal MS joins in the found ad hoc network AH in Step S106. If no ad hoc network AH is found, on the other hand, the processing returns to Step S101.

In Step S107, the radio terminal MS builds an ad hoc network AH. Specifically, when connecting to a radio base station BS, the radio terminal MS registers the radio base station BS as the master. When connecting to a different radio terminal MS, on the other hand, the radio terminal MS registers the different radio terminal MS as the master.

In Step S108, the radio terminal MS judges whether or not a connection request is received from a different radio terminal MS. Upon receipt of a connection request from a different radio terminal MS, the radio terminal MS registers the different radio terminal MS as a slave, in Step S109.

(3.2) Master/slave Reversing Operation

Next, description is given of master/slave reversing operation performed by the radio terminal MS, specifically, (3.2.1) Operation Example 1 and (3.2.2) Operation Example 2.

Here, Operation Example 1 is operation performed when the master/slave reversing is performed across two hierarchical levels. Operation Example 2 is operation performed when the master/slave reversing is performed across three hierarchical levels.

(3.2.1) Operation Example 1

Operation Example 1 of the master/slave reversing operation is described. In Operation Example 1, the master/slave reversing operation is assumed to be performed in a situation shown in FIG. 5. FIG. 6 is a sequence diagram showing Operation Example 1 of the master/slave reversing operation.

Figure 5:
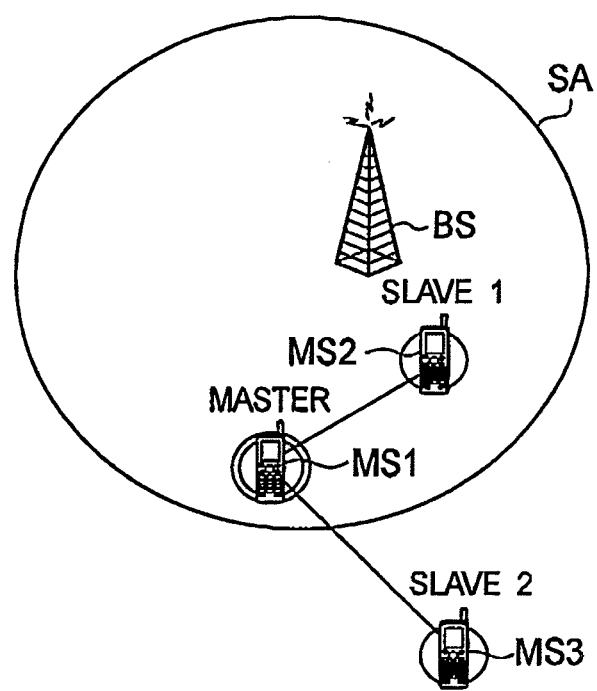
FIG. 5 is a view for describing Operation Example 1 of master/slave reversing operation according to the embodiment of the present invention.
Figure 6:
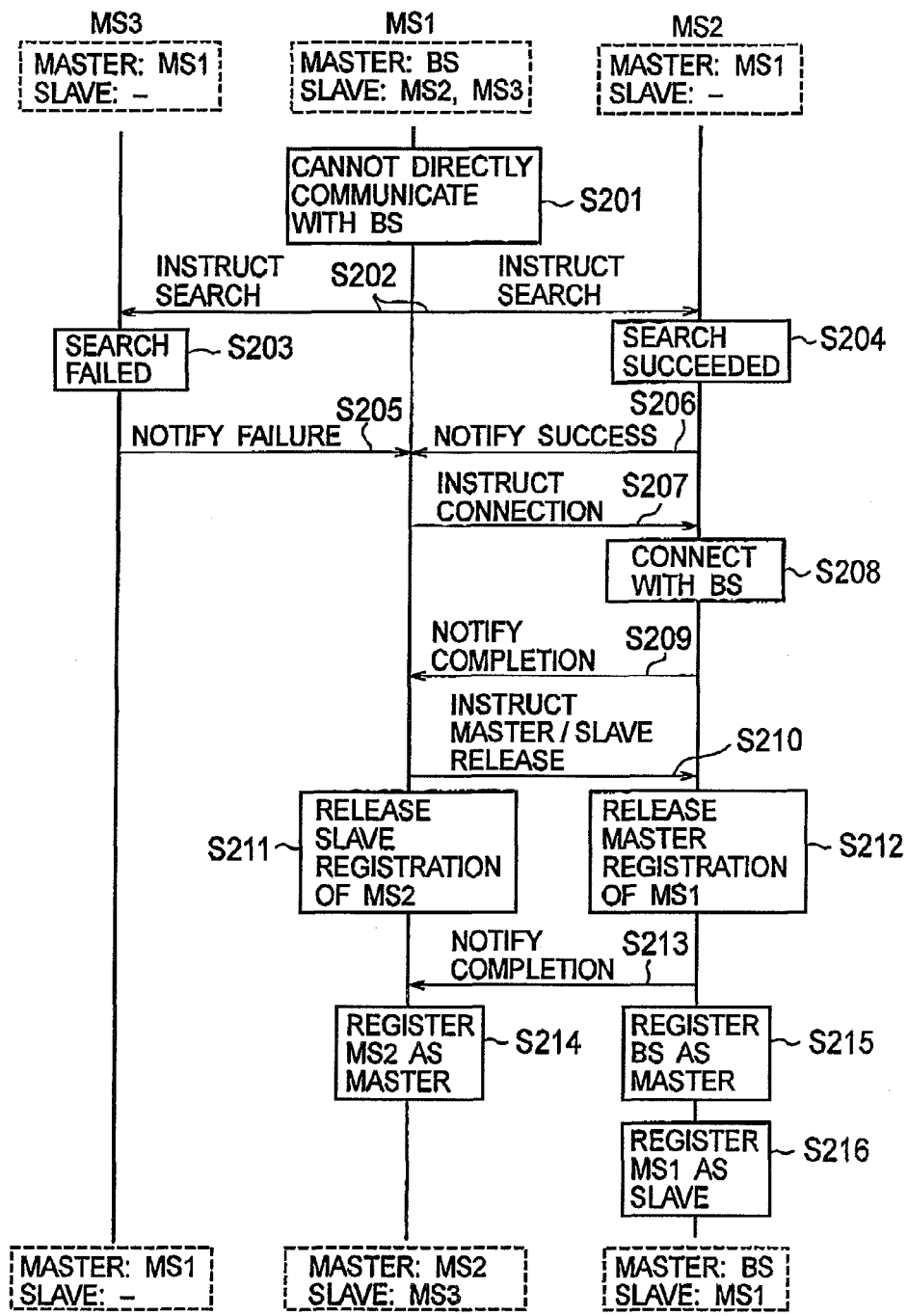
FIG. 6 is a sequence diagram showing Operation Example 1 of the master/slave reversing operation according to the embodiment of the present invention.

In FIG. 5, the radio terminal MS1 and the radio terminal MS2 are capable of directly communicating with the radio base station BS. The radio terminal MS1 is the master of the radio terminal MS2 and the radio terminal MS3. The radio terminal MS2 and the radio terminal MS3 are slaves of the radio terminal MS1.

Accordingly, as shown in FIG. 6, in the radio terminal MS1, the radio base station BS is registered as the master, and the radio terminal MS2 and the radio terminal MS3 are registered as slaves. In the radio terminal MS2, the radio terminal MS1 is registered as the master. In the radio terminal MS3, the radio terminal MS1 is registered as the master.

Here, the radio terminal MS1 is assumed to move from the inside of the service area SA of the radio base station BS to the outside of the service area SA.

In Step S201, the radio terminal MS1 judges that a direct communication with the radio base station BS is not possible to continue.

In Step S202, the radio terminal MS1 transmits a search instruction to the slaves (i.e., the radio terminal MS2 and the radio terminal MS3). Upon receipt of the search instruction, the radio terminal MS2 and the radio terminal MS3 perform a base station search.

In Step S203, the radio terminal MS3 fails in the base station search, while, in Step S204, the radio terminal MS2 succeeds in the base station search.

In Step S205, the radio terminal MS3 notifies the radio terminal MS1 of the search result indicating the failure in the base station search. In Step S206, the radio terminal MS2 notifies the radio terminal MS1 of the search result indicating the success in the base station search.

In Step S207, the radio terminal MS1 transmits a connection instruction instructing connection with the radio base station BS, to the radio terminal MS2. Upon receipt of the connection instruction, the radio terminal MS2 establishes a connection with the radio base station BS in Step S208. After establishing the connection with the radio base station BS, in Step S209, the radio terminal MS2 transmits a completion report indicating that the establishment of the connection with the radio base station is completed, to the radio terminal MS1.

In Step S210, the radio terminal MS1 transmits a master/slave release instruction instructing release of the master/slave relationship, to the radio terminal MS2. Then, the radio terminal MS1 releases the registration of the radio terminal MS2 as a slave, in Step S211.

Upon receipt of the master/slave release instruction, the radio terminal MS2 releases the registration of the radio terminal MS1 as the master, in Step S212. In Step S213, the radio terminal MS2 transmits a completion report indicating that the master registration is released, to the radio terminal MS1.

In Step S214, the radio terminal MS1 registers the radio terminal MS2 as the master.

In Step S215, the radio terminal MS2 registers the radio base station BS as the master. In addition, in Step S216, the radio terminal MS2 registers the radio terminal MS1 as a slave.

Through the above-described operation, in the radio terminal MS1, the radio terminal MS2 is registered as the master, and the radio terminal MS3 is registered as a slave. In the radio terminal MS2, the radio base station BS is registered as the master, and the radio terminal MS1 is registered as a slave.

Upon completion of the master/slave reversing operation, the radio terminal MS1 communicates with the radio base station BS via the radio terminal MS2. Moreover, the radio terminal MS1 relays a communication between the radio terminal MS3 and the radio base station BS. The radio terminal MS2 relays a communication between the radio terminal MS1 and the radio base station BS.

(3.2.2) Operation Example 2

Operation Example 2 of the master/slave reversing operation is described. In Operation Example 2, the master/slave reversing operation is assumed to be performed in a situation shown in FIG. 7. The radio terminal MS1 is assumed to have moved from the inside of the service area SA of the radio base station BS to the outside of the service area SA. The radio terminal MS3 is capable of directly communicating with the radio base station BS.

FIG. 8 is a sequence diagram showing Operation Example 2 of the master/slave reversing operation.

Figure 7:
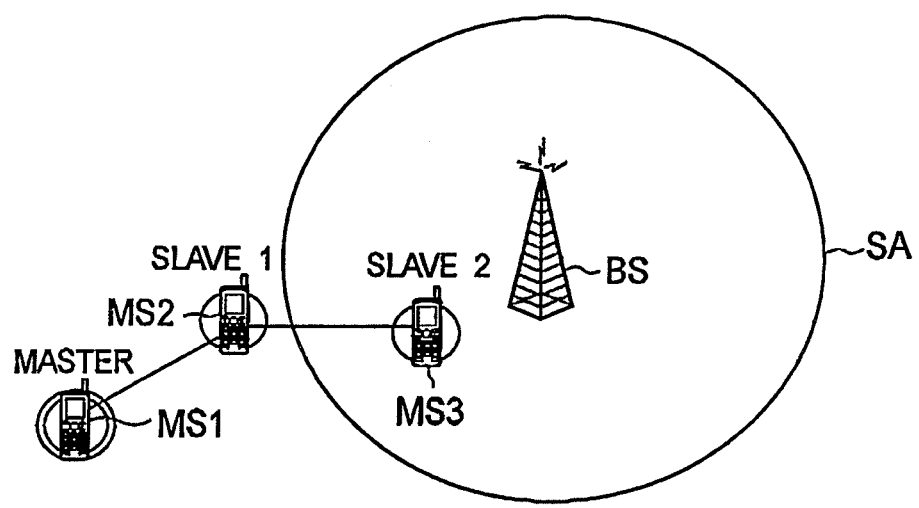
FIG. 7 is a view for describing Operation Example 2 of the master/slave reversing operation according to the embodiment of the present invention.

In FIG. 7, the radio terminal MS1 is the master of the radio terminal MS2. The radio terminal MS2 is a slave of the radio terminal MS1. The radio terminal MS2 is the master of the radio terminal MS3. The radio terminal MS3 is a slave of the radio terminal MS2.

Accordingly, as shown in FIG. 8, in the radio terminal MS1, the radio base station BS is registered as the master, and the radio terminal MS2 is registered as a slave. In the radio terminal MS2, the radio terminal MS1 is registered as the master, and the radio terminal MS3 is registered as a slave. In the radio terminal MS3, the radio terminal MS2 is registered as the master.

In Step S301 in FIG. 8, the radio terminal MS1 judges that a direct communication with the radio base station MS is not possible to continue.

In Step S302, the radio terminal MS1 transmits a search instruction to the slave (i.e., the radio terminal MS2). Upon receipt of the search instruction, the radio terminal MS2 performs a base station search.

In Step S303, the radio terminal MS2 fails in the base station search.

In Step S304, the radio terminal MS2 notifies the radio terminal MS1 of the search result indicating the failure in the base station search. In addition, in Step S305, the radio terminal MS2 transmits a search instruction to the slave (i.e., the radio terminal MS3).

Upon receipt of the search result, the radio terminal MS3 performs a base station search. In Step S306, the radio terminal MS3 succeeds in the base station search.

In Step S307, the radio terminal MS3 transmits the search result indicating the success in the base station search, to the radio terminal MS2. In Step S308, the radio terminal MS2 transmits the received search result to the radio terminal MS1.

Upon receipt of the search result indicating the success in the base station search, the radio terminal MS1 transmits a connection instruction instructing a connection with the radio base station BS, to the radio terminal MS2 in Step S309. In Step S310, the radio terminal MS2 transmits the received connection instruction to the radio terminal MS3.

Upon receipt of the connection instruction, the radio terminal MS3 establishes a connection with the radio base station BS in Step S311. After establishing the connection with the radio base station BS, the radio terminal MS3 transmits a completion report indicating that the establishment of the connection with the radio base station BS is completed, to the radio terminal MS2 in Step S312. In Step S313, the radio terminal MS2 transmits the received completion report to the radio terminal MS1.

In Step S314, the radio terminal MS1 transmits a master/slave release instruction instructing release of the master/slave relationship, to the radio terminal MS2. Then, in Step S315, the radio terminal MS1 releases the registration of the radio terminal MS2 as a slave.

Upon receipt of the master/slave release instruction, the radio terminal MS2 releases the registration of the radio terminal MS1 as the master, in Step S316. In Step S317, the radio terminal MS2 transmits a completion report indicating the release of the master registration, to the radio terminal MS1. Then, in Step S322, the radio terminal MS1 registers the radio terminal MS2 as the master.

In Step S318, the radio terminal MS2 transmits a master/slave release instruction to the radio terminal MS3. Then, in Step S319, the radio terminal MS2 releases the registration of the radio terminal MS3 as a slave.

Upon receipt of the master/slave release instruction, the radio terminal MS3 releases the registration of the radio terminal MS2 as the master, in Step S320. In Step S321, the radio terminal MS3 transmits a completion report indicating the release of the master registration, to the radio terminal MS2.

In Step S323, the radio terminal MS2 registers the radio terminal MS3 as the master. Moreover, in Step S325, the radio terminal MS2 registers the radio terminal MS1 as a slave.

In Step S324, the radio terminal MS3 registers the radio base station BS as the master. Moreover, in Step S326, the radio terminal MS3 registers the radio terminal MS2 as a slave.

Through the above-described operation, in the radio terminal MS1, the radio terminal MS2 is registered as the master. In the radio terminal MS2, the radio terminal MS3 is registered as the master, and the radio terminal MS1 is registered as a slave. In the radio terminal MS3, the radio base station BS is registered as the master, and the radio terminal MS2 is registered as a slave.

(4) Operations and Effects

According to this embodiment, the radio terminal MS judges whether or not the direct communication with the radio base station BS is possible to continue. When judging that the direct communication with the radio base station BS is not possible to continue, the radio terminal MS transmits a search instruction for inquiring whether or not a direct communication with the radio base station BS is possible, to each of its slaves. Then, when receiving a search result indicating that a direct communication with the radio base station BS is possible, from any of its slaves, the radio terminal MS registers the slave as the master.

In other words, when a direct communication between the master and the radio base station BS is not possible to continue and a slave is capable of directly communicating with the radio base station BS, the radio terminals MS forming the ad hoc network AH can communicate with the radio base station BS, by reversing the master/slave relationship.

According to this embodiment, when receiving a search result indicating that a direct communication with the radio base station BS is possible, from a slave, the radio terminal MS transmits a connection instruction instructing the slave to start a direct communication with the radio base station BS, to the slave. In other words, the radio terminals MS forming the ad hoc network AH can continue communicating with the radio base station BS, by instructing a slave capable of performing a direct communication with the radio base station BS, to establish a connection with the radio base station BS.

According to this embodiment, the radio terminal MS communicates with the radio base station BS via the master registered by the master management unit 133. Accordingly, when becoming a slave by master/slave reversing, the radio terminal MS can continue a communication with the radio base station BS by performing the communication with the radio base station via the master.

According to this embodiment, when a slave is registered as the master by the master management unit 133, the radio terminal MS stops a base station search. In such a way that the radio terminal MS which is now a slave would stop a base station search, power consumption by the radio terminal MS is reduced.

According to this embodiment, the radio terminal MS measures reception quality, which is the quality of a radio signal received from the radio base station BS, and then compares the reception quality with a threshold. When the reception quality is below the threshold, the radio terminal MS judges that the direct communication with the radio base station BS is not possible to continue. In this way, for example, when the radio terminal MS directly communicating with the radio base station BS moves outside the service area SA, it is possible to perform master/slave reversing between the radio terminal MS and a slave of the radio terminal MS before continuation of the communication becomes completely impossible.

According to this embodiment, the radio terminal MS detects a remaining battery charge amount of the battery 150, and then compares the remaining battery charge amount with a threshold. When the remaining battery charge amount of the battery 150 is below the threshold, the radio terminal MS judges that the direct communication with the radio base station BS is not possible to continue. In this way, it is possible to perform master/slave reversing between the radio terminal MS and a slave of the radio terminal MS before the battery 150 is used up and thereby the operation of the radio terminal MS stops.

According to this embodiment, the radio terminal MS detects a call restriction which restricts a direct communication with the radio base station BS. When the radio terminal MS fails to establish a connection with the radio base station BS after a call restriction is detected, the radio terminal MS judges that the direct communication with the radio base station BS is not possible to continue. In this way, it is possible to perform master/slave reversing between the radio terminal MS and a slave of the radio terminal MS before the communication by the radio terminal MS is disabled due to the call restriction.

According to this embodiment, when receiving a search instruction for inquiring whether or not a direct communication with the radio base station BS is possible, from the master, the radio terminal MS judges whether or not a direct communication with the radio base station BS is possible. When judging that a direct communication with the radio base station BS is possible, the radio terminal MS performs a direct communication with the radio base station BS, and registers the master as a slave.

In other words, when a direct communication between the master and the radio base station BS is not possible to continue and a slave is capable of directly communicating with the radio base station BS, the radio terminals MS forming the ad hoc network AH can communicate with the radio base station BS by reversing the master/slave relationship.

According to this embodiment, the radio terminal MS relays a communication between the radio base station BS and a slave registered by the slave management unit 135. Accordingly, when becoming the master by master slave relationship, the radio terminal MS relays a communication between the slave and the radio base station BS and thereby enables the slave to communicate (establish a connection) with the radio base station BS.

According to this embodiment, when judging that a direct communication with the radio base station BS is possible, the radio terminal MS transmits the search result indicating that a direct communication with the radio base station BS is possible, to the master. Then, the radio terminal MS receives a connection instruction instructing to start a direct communication with the radio base station BS, from the master. When being capable of directly communicating with the radio base station BS and receiving a connection instruction, the radio terminal MS performs a direct communication with the radio base station BS. In this way, by performing master/slave reversing after receiving a connection instruction, the radio terminal MS can perform master/slave reversing more reliably.

According to this embodiment, when judging that a direct communication with the radio base station BS is not possible after receiving a search instruction, the radio terminal MS transmits a search instruction to each of its slaves. In this way, a search instruction can be transmitted to the radio terminals MS in lower hierarchical levels.

(5) Other Embodiments

Hereinabove, the present invention is described on the basis of the embodiment. However, it is not to be understood that the statement and the drawings forming part of this disclosure are to limit the present invention. From this disclosure, various alternative embodiments, examples and operation techniques can be apparent to those skilled in the art.

In the above-described embodiment, whether or not a direct communication between the radio base station BS and the radio terminal MS is possible is judged based on any one of the judgments (a) to (c). However, the judgment may not be based only on the judgments (a) to (c). For example, in the case of the radio terminal MS which cannot perform a data communication during a voice communication, the radio terminal MS may judge that the direct communication with the radio base station BS is not possible to continue, when a voice communication is started.

Although the master/slave reversing operation is performed at the master's initiative in the above-described embodiment, the operation may be performed at the slave's initiative.

Although a mobile phone terminal is shown as an example of each radio terminal MS in the example in FIG. 1, the radio terminal MS may be a laptop, a personal digital assistant (PDA) or the like having a radio communication function. The ad hoc network AH may be formed by fixed radio terminals as well as portable radio terminals.

In the above-described ad hoc network building operation, an existing routing protocol such as DSR (Dynamic Source Routing) or AODV (Ad-hoc On-Demand Vector Routing) can be used.

It is to be understood that the present invention includes various embodiments and the like not described herein, as described above. Hence, the present invention is intended to be limited by the claimed elements according to the scope of claims reasonable from this disclosure.

It is to be noted that the entire content of Japanese Patent Application Publication No. 2007-209098 (filed on Aug. 10, 2007) is incorporated in the description of this application by reference.

INDUSTRIAL APPLICABILITY

As described above, the radio terminal and the radio communication method according to the present invention enable radio terminals forming a tree structure network, to communicate with a radio base station even when a root radio terminal of the tree structure network cannot continue a direct communication with the radio base station, the root radio terminal being a radio terminal directly communicating with the radio base station. Hence, the radio terminal and the radio communication method according to the present invention are advantageous in radio communication such as mobile communication.

We claim:

1. A system comprising: a first device configured to directly communicate with a radio base station; and a second device configured to communicate with the first device, wherein the first device transmits a first message to the second device inquiring whether a direct communication between the second device and the radio base station is possible when the first device determines that a reception level of a radio signal received from the radio base station is unstable, the second device performs a search upon receipt of the first message, the first device transmits a second message to the second device for causing a direct communication between the second device and the radio base station when the search indicates that direct communication between the second device and the radio base station is possible, and the second device directly communicates with the radio base station upon receipt of the second message for causing the direct communication.

2. A first device configured:
   to transmit, to a second device, a first message inquiring whether a direct communication between the second device and a radio base station is possible when the first device determines that reception level of a radio signal received by the first device from the radio base station is unstable; and
   to transmit, to the second device, a second message for causing a direct communication between the second device and the radio base station based on a result of a search, wherein the search is performed by the second device in response to receiving the first message.

3. A first device configured: to perform a search when the first device receives, from a second device, a first message inquiring whether a direct communication between the first device and a radio base station is possible, wherein the second device sends the first message when the second device determines that a reception level of a radio signal received by the second device from the radio base station is unstable; and to perform a direct communication with a radio base station when the first device receives, from the second device, a second message for causing a direct communication between the first device and the radio base station, wherein the second message is sent by the second device when a result of the search indicates that the first device can directly communicate with the radio base station.

* * * * *